United States Patent
Kang (10) Patent No.: US 11,833,992 B2
(45) Date of Patent: Dec. 5, 2023

(54) OCCUPANT RESTRAINING APPARATUS, AND CONTROL SYSTEM AND METHOD THEREOF

(71) Applicants: Hyundai Motor Company, Seoul (KR); Kia Corporation, Seoul (KR)

(72) Inventor: Seung-Kyu Kang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/880,330

(22) Filed: Aug. 3, 2022

(65) Prior Publication Data

US 2023/0211748 A1  Jul. 6, 2023

(30) Foreign Application Priority Data

Dec. 30, 2021  (KR) .................. 10-2021-0192715

(51) Int. Cl.
| | | |
|---|---|---|
| B60R 21/233 | (2006.01) | |
| B60R 21/2338 | (2011.01) | |
| B60R 21/08 | (2006.01) | |
| B60R 21/02 | (2006.01) | |

(52) U.S. Cl.
CPC ............ B60R 21/233 (2013.01); B60R 21/08 (2013.01); B60R 21/2338 (2013.01); *B60R 2021/028* (2013.01); *B60R 2021/23388* (2013.01)

(58) Field of Classification Search
CPC ... B60R 21/233; B60R 21/08; B60R 21/2338; B60R 2021/028; B60R 2021/23388
See application file for complete search history.

(56) References Cited

U.S. PATENT DOCUMENTS

| | | | | |
|---|---|---|---|---|
| 9,346,417 | B2* | 5/2016 | Sitko | B60R 13/0275 |
| 10,507,783 | B2* | 12/2019 | Rupp | B60R 21/231 |
| 10,864,876 | B2* | 12/2020 | Malapati | B60R 21/205 |
| 11,059,445 | B2* | 7/2021 | Malapati | B60R 21/232 |
| 11,247,632 | B2* | 2/2022 | Malapati | B60R 21/205 |
| 2016/0096491 | A1* | 4/2016 | Sitko | B60R 13/0275 |
| | | | | 280/730.2 |
| 2017/0050608 | A1* | 2/2017 | Meissner | B60R 21/232 |
| 2018/0186328 | A1* | 7/2018 | Raikar | B60R 21/08 |
| 2019/0256029 | A1* | 8/2019 | Ghannam | B62D 25/04 |
| 2020/0172039 | A1* | 6/2020 | Ghannam | B60R 21/2035 |

FOREIGN PATENT DOCUMENTS

| | | | | | |
|---|---|---|---|---|---|
| DE | 202012006364 | U1 * | 11/2013 | ............ | B60R 21/02 |
| DE | 202017001400 | U1 * | 5/2017 | ............ | B60J 5/0468 |
| DE | 102016211046 | A1 * | 12/2017 | | |
| JP | 2000062559 | A * | 2/2000 | ......... | B60G 17/0185 |
| KR | 20090062962 | A | 6/2009 | | |

* cited by examiner

*Primary Examiner* — Drew J Brown
(74) *Attorney, Agent, or Firm* — Slater Matsil, LLP (57) ABSTRACT

An embodiment occupant restraining apparatus includes a base to be fastened to a body of a vehicle, a support having a first end hinge-connected to the base and a second end configured to support a deployed airbag, and a bellows configured to be expanded by gas to pivot the support. During deployment of the airbag, the bellows is configured to receive the gas in concert with the deployment of the airbag.

20 Claims, 10 Drawing Sheets

OCCUPANT RESTRAINING APPARATUS, AND CONTROL SYSTEM AND METHOD THEREOF

CROSS-REFERENCE TO RELATED APPLICATIONS

This application claims the benefit of Korean Patent Application No. 10-2021-0192715, filed on Dec. 30, 2021, which application is hereby incorporated herein by reference.

TECHNICAL FIELD

The present disclosure relates to an occupant restraining apparatus and a control system and method of the occupant restraining apparatus.

BACKGROUND

A vehicle is provided with a variety of safety devices for protecting an occupant from an accident, such as a collision.

For example, there is an airbag system configured to deploy an airbag by exploding gunpowder when a vehicle collision is detected. Such airbag systems are increasingly mounted so as to cope with collisions in a plurality of directions. A curtain airbag, a side airbag, and the like are used to prevent the occupant from colliding with an inner surface or a door of the vehicle when a side collision is detected.

Figure 1:
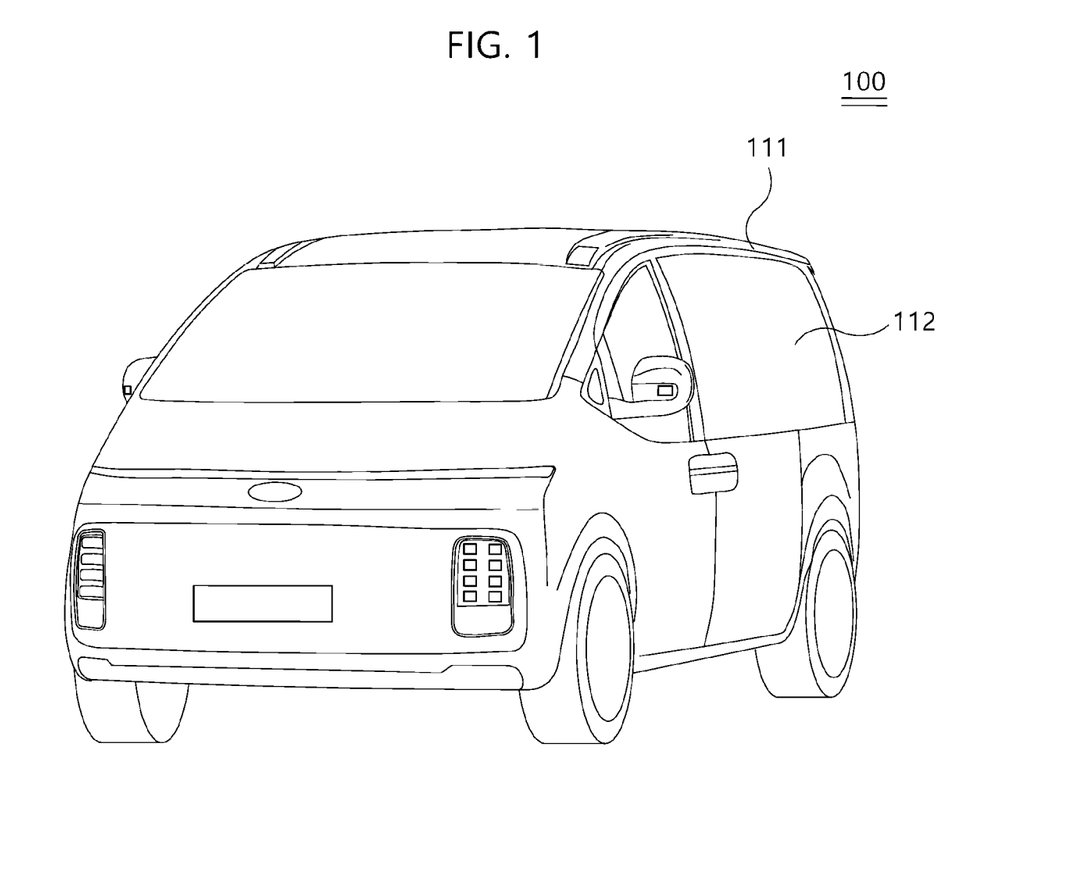
FIG. 1 is a perspective view illustrating a PBV to which a panoramic window is applied.

In a purpose built vehicle (PBV), a van, or the like, such as a vehicle 100 of FIG. 1, a window 112 disposed on a side in of the vehicle is applied as a panoramic type to ensure the vision of the occupant and the size thereof is gradually increasing.

However, as the size of the window 112 increases, it is difficult for an airbag 120 to prevent the occupant from being released from the vehicle when the airbag 120 is deployed.

Figure 2:
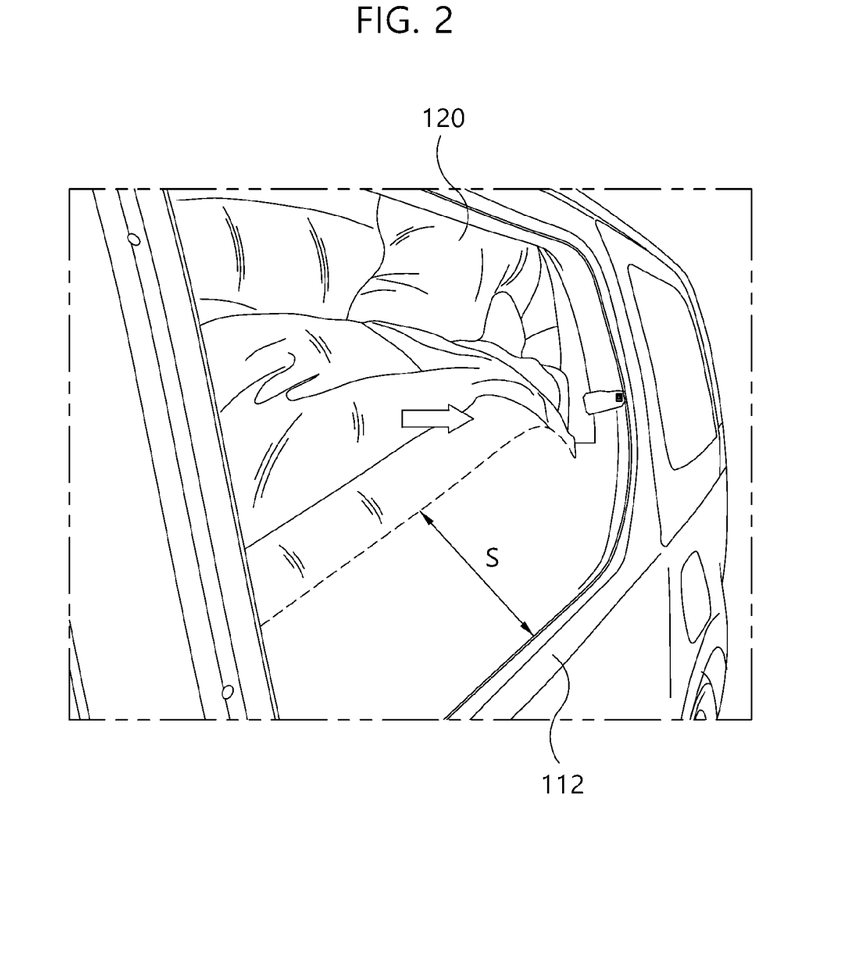
FIG. 2 is a perspective view illustrating a state in which the peripheral portion of an airbag is deformed in the event of a side collision according to the related art.

That is, as illustrated in FIG. 2, even in the case that a curtain airbag 120 is deployed in response to the detection of a collision, an edge portion of the airbag 120 is not supported by a frame portion of the vehicle. When a portion of the body of an occupant is forced to be released from the vehicle due to the inertia in the collision, the body of the occupant presses the edge portion of the airbag 120, so that a peripheral portion of the airbag is not supported by the frame portion. Thus, as the edge portion of the airbag 120 is deformed (as indicated with a dotted line in FIG. 2), the distance between the airbag 120 and the frame portion forms a space S through which the occupant may be released from the vehicle. As described above, since the occupant is not restrained by the airbag 120, there is a problem in that the occupant may be released outward through the space S.

SUMMARY

The present disclosure relates to an occupant restraining apparatus and a control system and a method thereof. Particular embodiments relate to an occupant restraining apparatus configured to support a deployed airbag so that an occupant is not released from a vehicle when an airbag is deployed in the case in which a vehicle collision is predicted, in the event of a collision, or the like, and a control system and method of the occupant restraining apparatus.

Accordingly, an embodiment of the present disclosure provides an occupant restraining apparatus configured to support the rear surface of an airbag in order to prevent an occupant from being released due to the deformation of a peripheral portion of the airbag when the airbag, such as a curtain airbag or a side airbag, is deployed, and a control system and method thereof.

An embodiment of the present disclosure provides an occupant restraining apparatus including a base fastened to a body of a vehicle, a support having one end hinge-connected to the base and the other end supporting a deployed airbag, and a bellows configured to be expanded by gas to pivot the support. When the airbag is operated, the gas may be supplied into the bellows in concert with an operation of the airbag.

The support may include an arm having a predetermined length, with one end of the arm being hinge-connected to the base, and a support surface provided on the one end of the arm, having a predetermined area, and configured to support the deployed airbag.

An intermediate portion of the arm may have a width greater than those of other portions of the arm to form a bellows connecting portion connected to the bellows.

The bellows may have a bottom end fixed to the base and a top end connected to the support. When the gas enters the bellows, the bellows may be stretched upward to pivot the support.

The occupant restraining apparatus may further include a gas cartridge fixedly disposed on the base and configured to store the gas for expanding the bellows and an electric gas valve connecting the bellows and the gas cartridge and configured to allow the gas cartridge and the bellows to communicate with each other when the collision of the vehicle is detected.

The electric gas valve may include a body including a channel through which the gas cartridge and the bellows communicate with each other, an actuator configured to operate to open and close the channel, and a drive part configured to drive the actuator to open the channel when the collision of the vehicle is detected.

The gas cartridge may be fastened to the base through a cartridge bracket, the cartridge bracket being fixed to the base while surrounding the gas cartridge.

The base may include a stopper protruding therefrom and configured to limit an angle of pivoting of the support.

The occupant restraining apparatus may further include a cover configured to cover the base.

In another embodiment, also provided is a control system of an occupant restraining apparatus, the control system including a collision sensor configured to detect a collision of the vehicle and a controller configured to control, when the collision of the vehicle is detected by the collision sensor, an airbag to be deployed and simultaneously to operate an electric gas valve so that gas is supplied from a gas cartridge to a bellows that pivots a support supporting the airbag.

In another embodiment, also provided is a control method of an occupant restraining apparatus including a support configured to support an airbag deployed by pivoting, a bellows configured to pivot the support while being stretched by gas, a gas cartridge configured to store gas for expanding the bellows, and an electric gas valve connecting the bellows and the gas cartridge and configured to control supply of the gas from the gas cartridge to the bellows. The control method may include a sensor operation start step of starting an operation of the collision sensor to detect a collision of a vehicle, a collision detection determination step of determining, by a controller, whether or not the collision sensor has detected the collision of the vehicle, and an airbag and electric gas valve operation start step of starting operations of the airbag and the electric gas valve when the controller determines that the collision sensor has detected the collision. After the airbag and electric gas valve operation start step, an airbag deployment step of deploying, by the controller, the airbag by operating an inflator of the airbag and a support operation step of operating, by the controller, the electric gas valve to supply the gas from the gas cartridge to the bellows to stretch the bellows so that the support is pivoted to support the airbag may be performed, and the airbag deployment step and the support operation step may be simultaneously performed.

According to the occupant restraining apparatus having the above-described configuration and the control system and method thereof according to embodiments of the present disclosure, when a curtain airbag or a side airbag is operated in response to a side collision or the like, the occupant restraining apparatus starts to operate simultaneously with the curtain airbag or the side airbag to support the rear surface of the airbag, thereby preventing a peripheral portion of the deployed airbag from being deformed.

Since the rear surface of the deployed airbag is supported without a deformation in the periphery of the airbag, it is possible to overcome a problem in that an occupant of a vehicle is released from the vehicle through a space between the airbag and the frame.

DETAILED DESCRIPTION OF ILLUSTRATIVE EMBODIMENTS

Hereinafter, an occupant restraining apparatus and a control method thereof according to embodiments of the present disclosure will be described in detail with reference to the accompanying drawings.

An occupant restraining apparatus 30 according to embodiments of the present disclosure includes a base 31 fastened to a body 11 of a vehicle 100, a support 33 having one end hinge-connected to the base 31 and the other end supporting a deployed airbag 20, and a bellows 34 configured to be expanded by gas to pivot the support 33. When the airbag 20 is operated, the gas is supplied into the bellows 34 in concert with the operation of the airbag 20.

The base 31 is fastened to the body of the vehicle, and accommodates therein respective components to be described later.

Figure 6:
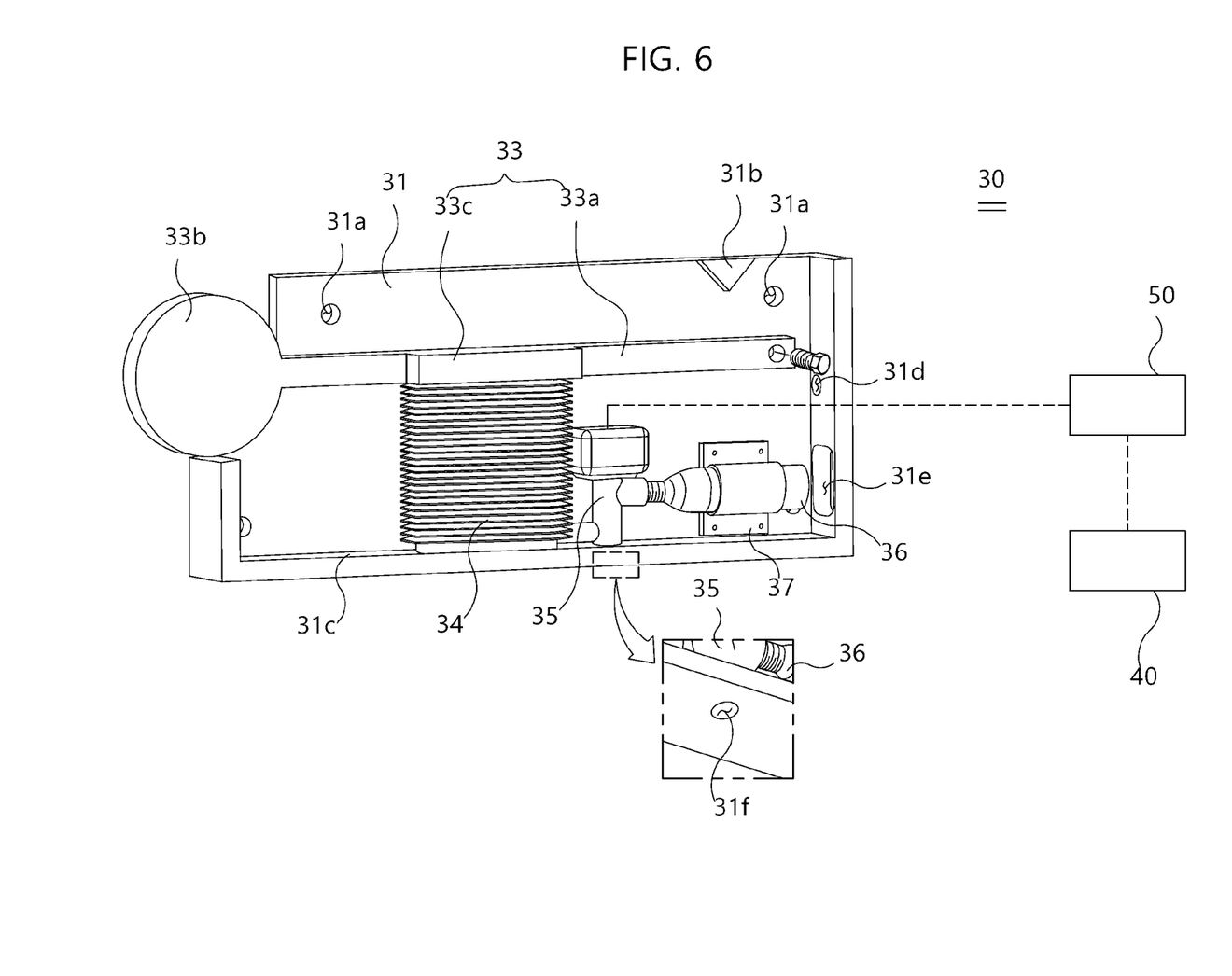
FIG. 6 is a perspective view illustrating the internal structure of the occupant restraining apparatus according to embodiments of the present disclosure.

The base 31 is fastened to the body of the vehicle at a position adjacent to a portion of the vehicle on which a window 12 is formed. The base 31 has a fastening hole 31a through which the base 31 is fastened to the body 11 of the vehicle. The base 31 is fastened to the body of the vehicle using the fastening hole 31a.

Figure 3:
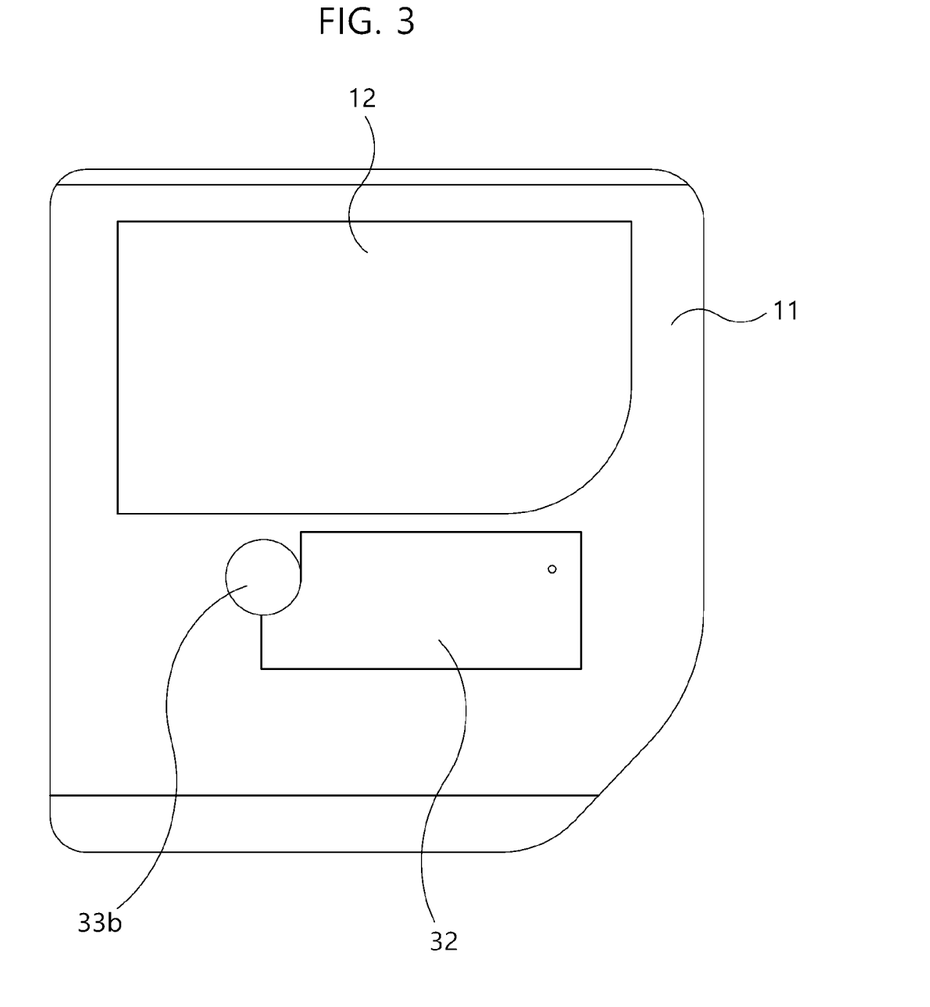
FIG. 3 is a front view illustrating an occupant restraining apparatus according to embodiments of the present disclosure.

A cover 32 covers the base 31 to protect components disposed inside the base 31.

Figure 4:
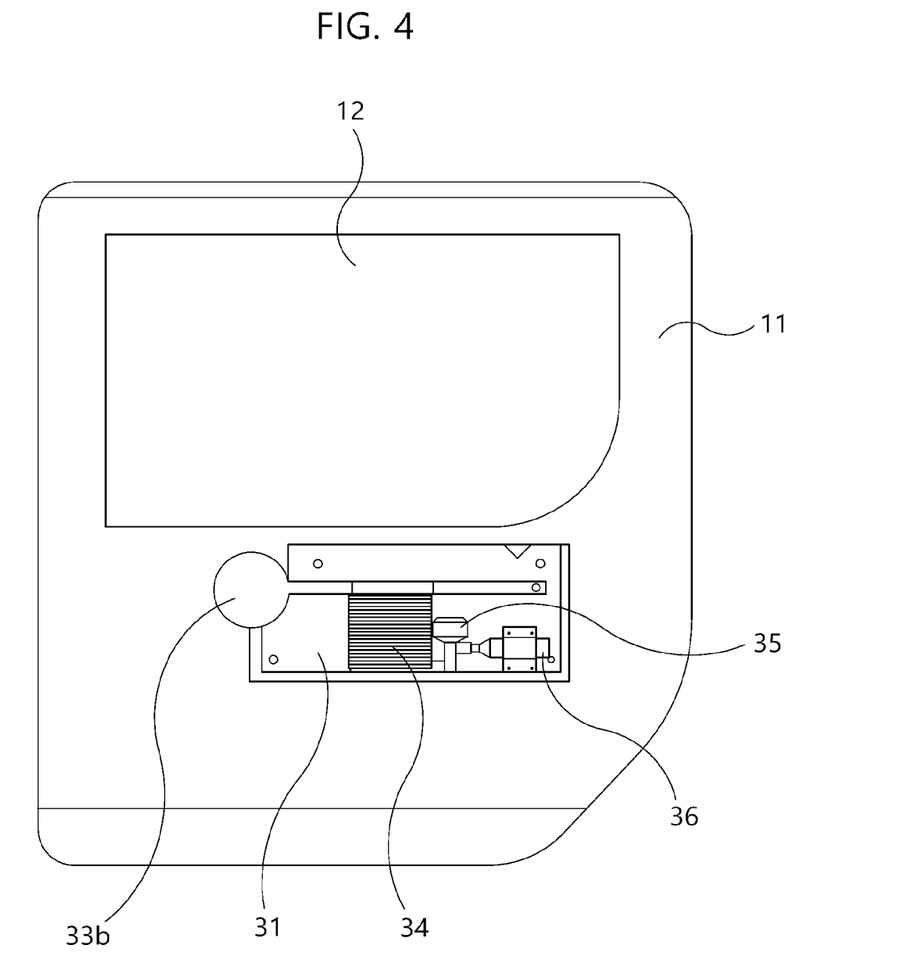
FIG. 4 is a front view illustrating a state in which a cover is removed from the occupant restraining apparatus according to embodiments of the present disclosure.
Figure 5:
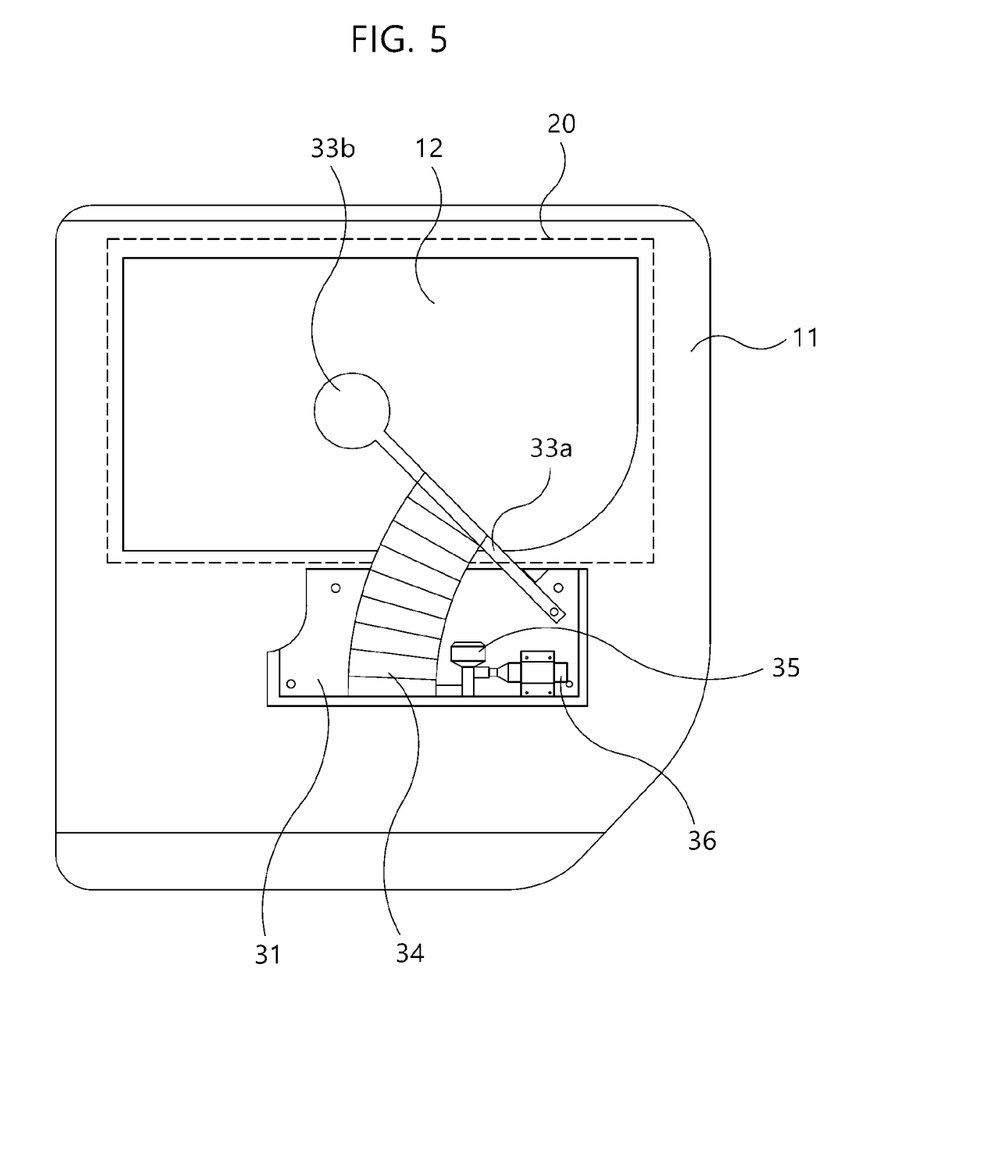
FIG. 5 is a front view illustrating a state in which the occupant restraining apparatus according to embodiments of the present disclosure is operated.

One end of the support 33 is hinge-connected to the base 31 in a pivotable manner. When the airbag 20 is deployed, the other end of the support 33 supports the airbag 20.

The support 33 includes an arm 33a having one end hinge-connected to the base 31 and a support surface 33b having a predetermined area and configured to support the airbag 20.

The arm 33a has a predetermined length, and is disposed inside the base 31 in a pivotable manner. Since one end of the arm 33a is hinge-connected to the base 31, the arm 33a is pivotable.

The support surface 33b is formed at one end of the arm 33a, i.e., one portion of the arm 33a opposite the other portion of the arm 33a hinge-connected to the base 31. The area of the support surface 33b is determined such that the support surface 33b may support the deployed airbag 20. Since the airbag 20 has been filled with and deployed by the gas generated by the explosion of gunpowder, the support surface 33b having the predetermined area supports the deployed airbag 20. Since the support surface 33b supports the deployed airbag 20, it is possible to prevent the peripheral portion of the airbag 20 from being deformed by the inertia of the occupant tending to be released outward.

A bellows connecting portion 33c having a width greater than the width of the arm 33a is provided on a portion of the arm 33a. Since the width of the bellows connecting portion 33c is greater than the width of the arm 33a, it is possible to easily fix the bellows 34 to the support 33.

The arm 33a, the support surface 33b, and the bellows connecting portion 33c are formed integrally with one another, thereby forming the support 33.

In addition, a stopper 31b protrudes from the base 31, thereby preventing the support 33 from pivoting beyond a predetermined angle. The support 33 may pivot until contacting the stopper 31b from the initial position.

When the gas is supplied into the bellows 34, the bellows 34 is stretched upward.

The bottom end of the bellows 34 is fixed to one side of the base 31, and the top end of the bellows 34 is fixed to the support 33. When the bellows 34 is stretched upward, the bellows 34 pivots the support 33. A bellows connecting surface 31c is formed such that the bottom end of the bellows 34 is reliably fixed to the base 31. The bottom end of the bellows 34 is fixed to the bellows connecting surface sic. The top end of the bellows 34 is fixed to the bottom surface of the bellows connecting portion 33c. The top end and the bottom end of the bellows 34 may be fixed to the arm 33a and the base 31 by bonding.

A gas cartridge 36 stores the gas by which the bellows 34 is expanded. The gas stored in the gas cartridge 36 may be carbon dioxide. The gas cartridge 36 is fixed to the base 31 through a cartridge bracket 37. The cartridge bracket 37 is fixed to the base 31 while surrounding the gas cartridge 36.

In addition, the base 31 has an assembly hole 31e used when fastening the gas cartridge 36 to the base 31.

An electric gas valve 35 is disposed between the gas cartridge 36 and the bellows 34 on the base 31 to supply the gas stored in the gas cartridge 36 to the bellows 34 by working in concert with the deployment of the airbag 20.

Figure 7:
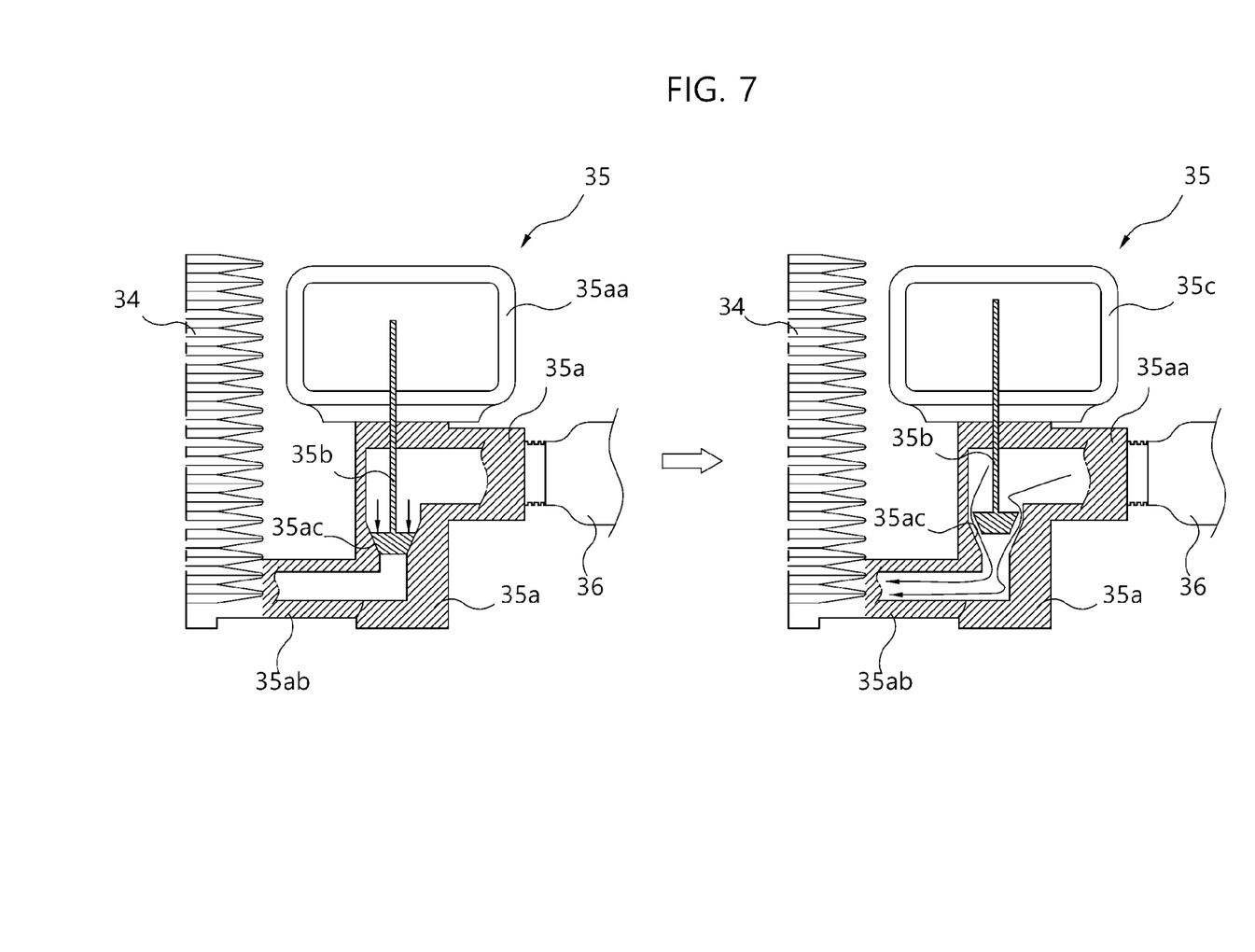
FIG. 7 is a cross-sectional view illustrating a flow of gas in response to the operation of the electric gas valve in the occupant restraining apparatus according to embodiments of the present disclosure.

In this regard, the electric gas valve 35 includes a body 35a having a channel through which the gas cartridge 36 and the bellows 34 communicate with each other, an actuator 35b configured to operate to open and close the channel, and a drive part 35c configured to drive the actuator 35b to open the channel when a collision of the vehicle is detected.

Since the channel is formed inside the body 35a, the gas cartridge 36 and the bellows 34 are connected to communicate with each other. The body 35a includes a cartridge connecting portion 35aa connected to the gas cartridge 36 and a bellows connecting portion 35ab connected to the bellows 34. A portion of the body 35a between the cartridge connecting portion 35aa and the bellows connecting portion 35ab is hollow, thereby forming the channel. In addition, an opening/closing portion 35ac is formed in an intermediate portion of the body 35a so as to be opened and closed by the operation of the actuator 35b.

The actuator 35b opens and closes the channel with the opening/closing portion 35ac. The actuator 35b may operate to move the opening/closing portion 35ac from a closed state to an opened state while moving in the axial direction of the actuator 35b.

The drive part 35c drives the actuator 35b. The drive part 35c is implemented as a solenoid, an electric motor, or the like to drive the actuator 35b. The actuator 35b remains closing the opening/closing portion 35ac at ordinary time. When the airbag 20 is deployed, the drive part 35c drives the actuator 35b to open the opening/closing portion 35ac.

The electric gas valve 35 is fastened to the base 31 in response to a fastening bolt being fastened to a valve fastening hole 31f formed on the base 31. In addition, a wire hole 31d is formed in the base 31, and wires through which a control signal and power necessary for the operation of the electric gas valve 35 are input may be disposed through the wire hole 31d.

FIG. 7 illustrates a configuration in which the gas is supplied from the gas cartridge 36 to the bellows 34 in response to the operation of the electric gas valve 35. That is, in a situation in which the actuator 35b closes the opening/closing portion 35ac (left section of FIG. 7), when the drive part 35c drives the actuator 35b to open the opening/closing portion 35ac, the gas is supplied from the gas cartridge 36 to the bellows 34.

Figure 9:
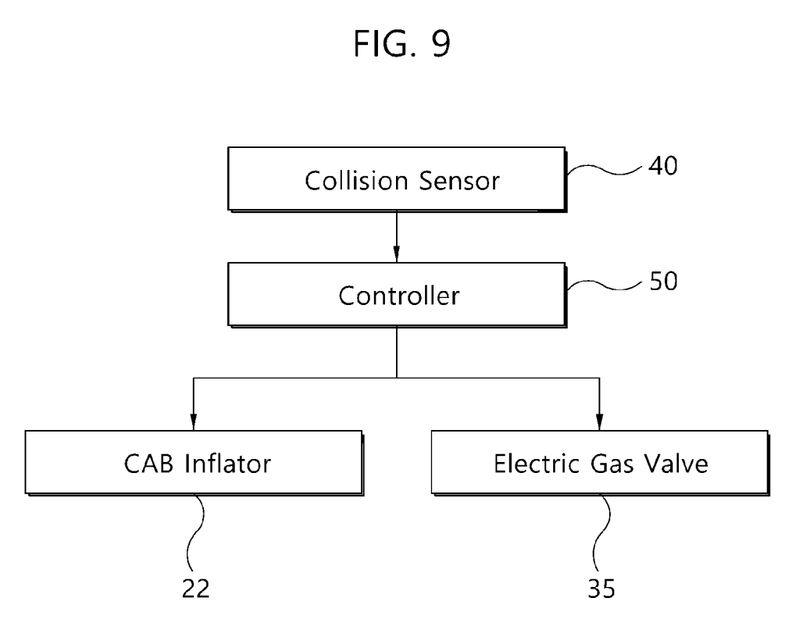
FIG. 9 is a block diagram illustrating a control system of the occupant restraining apparatus according to embodiments of the present disclosure.

FIGS. 6 and 9 illustrate a control system of the occupant restraining apparatus according to embodiments of the present disclosure.

The control system of the occupant restraining apparatus according to embodiments of the present disclosure is configured to control the operation of the above-described occupant restraining apparatus 30.

A collision sensor 40 detects a collision of the vehicle. Particularly, the collision sensor 40 may be configured to detect a side collision of the vehicle.

A controller 50 controls the operation of the airbag 20 and the electric gas valve 35 on the basis of signals input from the collision sensor 40.

That is, when a signal resulting from the detection of a collision is input from the collision sensor 40, the controller 50 outputs a signal to operate the airbag 20. For example, the controller 50 may operate a curtain airbag (CAB) inflator 22.

At the same time, the controller 50 controls the electric gas valve 35 so that the drive part 35c drives the actuator 35b.

Figure 8:
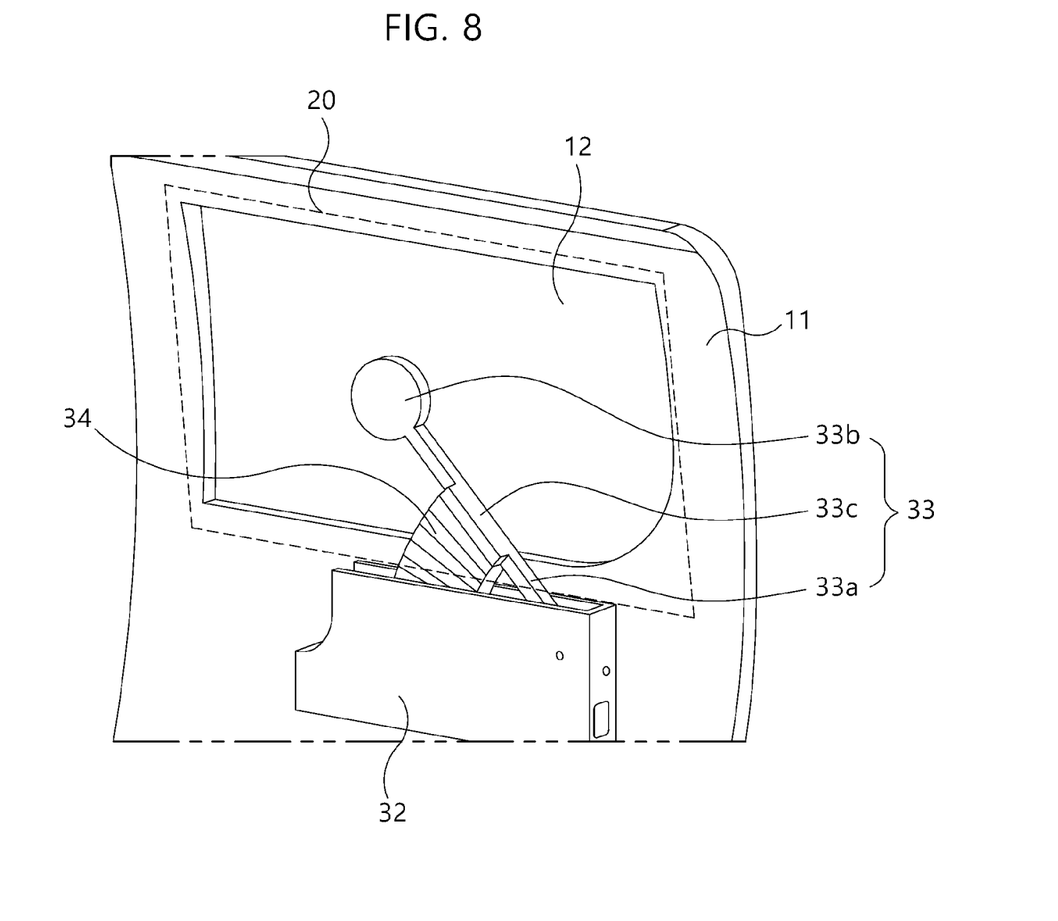
FIG. 8 is a perspective view illustrating a state in which the occupant restraining apparatus according to embodiments of the present disclosure is operated.

When the electric gas valve 35 is operated, the actuator 35b opens the channel to supply the gas from the gas cartridge 36 to the bellows 34. When the gas is supplied into the bellows 34, the bellows 34 is stretched to pivot the support 33. When the support surface 33b is exposed to the window 12 in response to the pivoting of the support 33, the deployed airbag 20 is supported by the support 33.

The controller 50 may be an airbag control unit (ACU). When the controller 50 is the ACU, the controller 50 may additionally control the occupant restraining apparatus 30 while basically performing a function of controlling the operation of the airbag 20.

Figure 10:
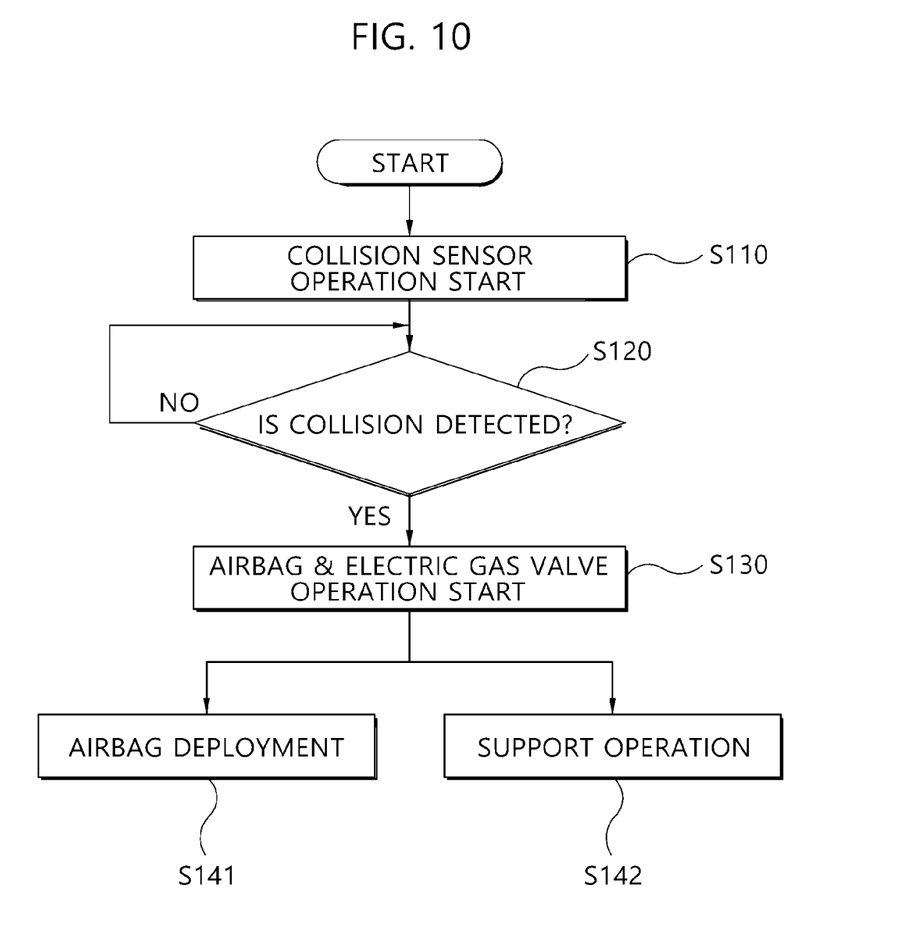
FIG. 10 is a flowchart illustrating a control method of the occupant restraining apparatus according to embodiments of the present disclosure.

FIG. 10 illustrates a control method of the occupant restraining apparatus according to embodiments of the present disclosure.

In a sensor operation start step S110, an operation of the collision sensor 40 that detects a vehicle collision is started. The sensor operation start step S110 may be performed when the vehicle is in a key-on state or started.

In a collision detection determination step S120, the controller 50 determines whether or not the collision sensor 40 has detected a collision of the vehicle. Since the controller 50 and the collision sensor 40 are connected, when the collision sensor 40 detects the collision, the signal of the collision sensor 40 is input to the controller 50, and the controller 50 detects the collision of the vehicle on the basis of the signal.

When the controller 50 detects the collision of the vehicle (YES to S120), an airbag and electric gas valve operation start step S130 is performed. In the airbag and electric gas valve operation start step S130, the controller 50 starts controlling the airbag 20 and the electric gas valve 35.

After the airbag and electric gas valve operation start step S130, an airbag deployment step S141 and a support operation step S142 are simultaneously performed. In the airbag deployment step S141, the controller 50 operates the inflator of the airbag 20 to deploy the airbag 20. In addition, in the support operation step S142, the controller 50 operates the electric gas valve 35 to supply the gas from the gas cartridge 36 to the bellows 34, thereby stretching the bellows 34. Consequently, the support 33 is pivoted, thereby supporting the deployed airbag 20.

Since the airbag 20 is deployed by the CAB inflator 22 based on the explosion of gunpowder, the deployment of the airbag 20 is finished faster than the bellows 34 operating in response to the expansion of the gas. However, since the support 33 supports the deployed airbag 20 before the occupant arrives at the deployed airbag 20, it is possible to prevent the occupant from being released from the vehicle.

What is claimed is:

1. An occupant restraining apparatus comprising:
   a base to be fastened to a body of a vehicle;
   a support having a first end hinge-connected to the base and a second end configured to support a deployed airbag; and
   a bellows configured to be expanded by gas to pivot the support, wherein, during deployment of the airbag, the bellows is configured to receive the gas in concert with the deployment of the airbag;

a gas cartridge fixedly disposed on the base and configured to store the gas for expanding the bellows; and
an electric gas valve connecting the bellows and the gas cartridge and configured to allow the gas cartridge and the bellows to communicate with each other in response to detection of a collision of the vehicle, wherein the electric gas valve comprises:
a body comprising a channel through which the gas cartridge and the bellows communicate with each other;
an actuator configured to operate to open and close the channel; and
a drive part configured to drive the actuator to open the channel in response to the detection of the collision of the vehicle.

2. The apparatus of claim 1, wherein the support comprises:
an arm having a predetermined length and having a first end hinge-connected to the base; and
a support surface provided on the second end of the arm, the support surface having a predetermined area and configured to support the deployed airbag.

3. The apparatus of claim 2, wherein an intermediate portion of the arm has a width greater than widths of other portions of the arm, and wherein the intermediate portion is connected to the bellows.

4. The apparatus of claim 1, wherein the bellows has a bottom end fixed to the base and a top end connected to the support, and wherein, in response to the gas entering the bellows, the bellows is configured to stretch upward to pivot the support.

5. The apparatus of claim 1, wherein the gas cartridge is fastened to the base through a cartridge bracket, the cartridge bracket being fixed to the base while surrounding the gas cartridge.

6. The apparatus of claim 1, wherein the base comprises a stopper protruding therefrom and configured to limit an angle of pivoting of the support.

7. The apparatus of claim 1, further comprising a cover configured to cover the base.

8. A control system of an occupant restraining apparatus, the control system comprising:
a collision sensor configured to detect a collision of a vehicle; and
a controller configured to control, in response to detection of the collision of the vehicle by the collision sensor, an airbag to be deployed and simultaneously to operate an electric gas valve so that gas is supplied from a gas cartridge to a bellows that pivots a support supporting the airbag;
wherein a base of the occupant restraining apparatus is fastened to a body of the vehicle;
wherein the support has a first end hinge-connected to the base and a second end supporting the airbag; and
wherein the gas cartridge is fixedly disposed on the base and is configured to store the gas for expanding the bellows; and
wherein the electric gas valve connects the bellows and the gas cartridge and is configured to allow the gas cartridge and the bellows to communicate with each other in response to the detection of the collision of the vehicle; and
wherein the electric gas valve comprises a body comprising a channel through which the gas cartridge and the bellows communicate with each other, an actuator configured to operate to open and close the channel, and a drive part configured to drive the actuator to open the channel in response to the detection of the collision of the vehicle.

9. The control system of claim 8, wherein the support comprises:
an arm having a predetermined length and having a first end hinge-connected to the base; and
a support surface provided on the first end of the arm, the support surface having a predetermined area and configured to support the airbag.

10. The control system of claim 9, wherein an intermediate portion of the arm has a width greater than widths of other portions of the arm, and wherein the intermediate portion is connected to the bellows.

11. The control system of claim 8, wherein the bellows has a bottom end fixed to the base and a top end connected to the support, and wherein, in response to the gas entering the bellows, the bellows is configured to stretch upward to pivot the support.

12. The control system of claim 8, wherein the gas cartridge is fastened to the base through a cartridge bracket, the cartridge bracket being fixed to the base while surrounding the gas cartridge.

13. The control system of claim 8, wherein the base comprises a stopper protruding therefrom and configured to limit an angle of pivoting of the support.

14. The control system of claim 8, further comprising a cover configured to cover the base.

15. A vehicle comprising:
a vehicle body;
a base fastened to the vehicle a body;
an airbag;
a support having a first end hinge-connected to the base and a second end configured to support the airbag; and
a bellows configured to be expanded by gas to pivot the support, wherein, during deployment of the airbag, the bellows is configured to receive the gas in concert with the deployment of the airbag;
a gas cartridge fixedly disposed on the base and configured to store the gas for expanding the bellows; and
an electric gas valve connecting the bellows and the gas cartridge and configured to allow the gas cartridge and the bellows to communicate with each other in response to detection of a collision of the vehicle, wherein the electric gas valve comprises:
a body comprising a channel through which the gas cartridge and the bellows communicate with each other;
an actuator configured to operate to open and close the channel; and
a drive part configured to drive the actuator to open the channel in response to the detection of the collision of the vehicle.

16. The vehicle of claim 15, further comprising:
a collision sensor configured to detect a collision of the vehicle; and
a controller configured to control, in response to detection of the collision of the vehicle by the collision sensor, the airbag to be deployed and simultaneously to operate the electric gas valve so that gas is supplied from the gas cartridge to the bellows that pivots the support.

17. The vehicle of claim 15, wherein the support comprises:
an arm having a predetermined length and having a first end hinge-connected to the base; and
a support surface provided on the second end of the arm, the support surface having a predetermined area.

18. The vehicle of claim 17, wherein an intermediate portion of the arm has a width greater than widths of other portions of the arm, and wherein the intermediate portion is connected to the bellows.

19. The vehicle of claim 15, wherein the bellows has a bottom end fixed to the base and a top end connected to the support, and wherein, in response to the gas entering the bellows, the bellows is configured to stretch upward to pivot the support.

20. The vehicle of claim 15, wherein the gas cartridge is fastened to the base through a cartridge bracket, the cartridge bracket being fixed to the base while surrounding the gas cartridge.

\* \* \* \* \*